US012629909B2

(12) United States Patent
Bergad et al.

(10) Patent No.: US 12,629,909 B2
(45) Date of Patent: May 19, 2026

(54) CANNABIS FOOT PRESS

(71) Applicant: SunSoil PBC, Burlington, VT (US)

(72) Inventors: Alejandro Bergad, Burlington, VT (US); Jacob Goldstein, Burlington, VT (US)

(73) Assignee: SUNSOIL PBC, Burlington, VT (US)

(*) Notice: Subject to any disclaimer, the term of this patent is extended or adjusted under 35 U.S.C. 154(b) by 315 days.

(21) Appl. No.: 18/415,033

(22) Filed: Jan. 17, 2024

(65) Prior Publication Data

US 2024/0239072 A1 Jul. 18, 2024

Related U.S. Application Data

(60) Provisional application No. 63/480,168, filed on Jan. 17, 2023.

(51) Int. Cl.

| | |
|---|---|
| ***B30B 15/06*** | (2006.01) |
| ***B30B 1/04*** | (2006.01) |
| ***B30B 9/04*** | (2006.01) |

(52) U.S. Cl.
CPC .................. *B30B 9/04* (2013.01); *B30B 1/04* (2013.01); *B30B 15/064* (2013.01)

(58) Field of Classification Search
CPC ........... B30B 1/04; B30B 9/04; B30B 15/064; B30B 15/34; A45D 2/001
See application file for complete search history.

(56) References Cited

U.S. PATENT DOCUMENTS

| | | | | |
|---|---|---|---|---|
| 2,441,817 | A | 5/1948 | Huff | |
| 10,745,648 | B1 | 8/2020 | Lewis | |
| 2012/0291797 | A1* | 11/2012 | deGrood | A45D 1/28 132/211 |
| 2014/0238600 | A1* | 8/2014 | Mahn | B44C 1/1712 156/309.9 |
| 2015/0201726 | A1* | 7/2015 | Prats | A45D 1/04 219/225 |

(Continued)

FOREIGN PATENT DOCUMENTS

| | | |
|---|---|---|
| DE | 202004017108 | 10/2005 |

OTHER PUBLICATIONS

Pfrommer, Rick; "Rosin: The Hot Concentrate"; Freedom Leaf; Feb. 27, 2017; pp. 2; <https://www.freedomleaf.com/pressing-matter-rosin/>.

*Primary Examiner* — Jimmy T Nguyen
(74) *Attorney, Agent, or Firm* — Hoffman Warnick LLC

(57) ABSTRACT

A foot press system for extracting rosin. The system includes a baseplate configured to releasably attach to a heat press unit having a top section with a first heat plate and a bottom section having a second heat plate, wherein the top section is configured to close downwardly towards the bottom section such that the first heat plate is pressable towards the second heat plate. The baseplate includes a substrate having a first side adapted to lay on a flat surface and a second side adapted to receive the bottom section of the heat press unit; a pair of lateral stabilizer guide coupled to substrate and configured to maintain the top section in a laterally stable position as the top section is closed downwardly; and a notch configured to receive an end of the of the bottom section of the heat press unit proximate the second heat plate.

14 Claims, 7 Drawing Sheets

(56) References Cited

U.S. PATENT DOCUMENTS

| | | | | |
|---|---|---|---|---|
| 2017/0231350 | A1* | 8/2017 | Moore | A45D 2/001 132/224 |
| 2018/0008655 | A1* | 1/2018 | Weikel | B30B 15/064 |
| 2018/0093439 | A1 | 4/2018 | Galkin et al. | |
| 2018/0257326 | A1 | 9/2018 | Sitnik | |
| 2018/0263349 | A1* | 9/2018 | Cooper | A45D 1/00 |
| 2019/0152179 | A1 | 5/2019 | Levine | |
| 2019/0263079 | A1 | 8/2019 | Britton | |
| 2019/0291376 | A1 | 9/2019 | Xu | |
| 2020/0122188 | A1 | 4/2020 | Tumey | |
| 2020/0147915 | A1 | 5/2020 | Mayer | |
| 2021/0078278 | A1 | 3/2021 | Kibler | |
| 2021/0299989 | A1 | 9/2021 | Britton et al. | |
| 2023/0079779 | A1 | 3/2023 | Bavoux | |

* cited by examiner

CANNABIS FOOT PRESS

TECHNICAL FIELD

The subject matter of this invention relates to extracting rosin from a cannabis bud, and more particularly to extracting rosin from a cannabis bud using a foot press with heating plates.

BACKGROUND

With the continued legalization of cannabis, users are seeking to better control and manage the intake of THC. A common approach is to utilize a vaporizer (e.g., a vape pen) that stores a quantity of cannabis oil (i.e., "rosin"), which is heated and vaporized for inhalation. One of the downsides with this approach is that the user must rely on third party manufacturers to produce and package the rosin. Industrial processes for extracting rosin from cannabis plants can involve chemicals and/or other substances which may not be desirable. Furthermore, for those users who grow their own cannabis plants or otherwise want to extract the rosin themselves, solvents and/or complicated processes are required, which can be less than desirable.

SUMMARY

Aspects of the disclosure provide a cannabis foot press system, kit and associated method for easily extracting rosin from cannabis.

In one aspect, a foot press system is provided for extracting rosin from a cannabis bud, comprising: a baseplate configured to releasably attach to a heat press unit having a top section with a first heat plate and a bottom section having a second heat plate, wherein the top section is configured to close downwardly towards the bottom section such that the first heat plate is pressable towards the second heat plate, and wherein the baseplate includes: a substrate having a first side adapted to lay on a flat surface and a second side adapted to receive the bottom section of the heat press unit; a pair of lateral stabilizer guide coupled to substrate and configured to maintain the top section in a laterally stable position as the top section is closed downwardly; and a notch configured to receive an end of the bottom section of the heat press unit proximate the second heat plate.

In a second aspect, a foot press system is provided for extracting rosin from a cannabis bud, comprising: a heat press unit having a top section with a first heat plate and a bottom section having a second heat plate, wherein the top section is configured to close downwardly towards the bottom section such that the first heat plate is pressable towards the second heat plate; a baseplate configured to releasably attach to the heat press unit, wherein the baseplate includes: a substrate having a first side adapted to lay on a flat surface and a second side adapted to receive the bottom section of the heat press unit; and a pair of lateral stabilizer guide coupled to substrate and configured to maintain the top section in a laterally stable position as the top section is closed downwardly.

In a third aspect, foot press for extracting rosin from a cannabis bud, comprising: a bottom section adapted to lay on a flat surface and having a first heat plate; a top section coupled to the bottom section with a hinge and having a second heat plate, the top section being configured to close downwardly towards the bottom section such that the second heat plate is pressed towards the first heat plate; and a lateral stabilizer guide coupled to the bottom section and adapted to maintain the top section in a laterally stable position as the top section is closed downwardly.

BRIEF DESCRIPTION OF THE DRAWINGS

These and other features of this invention will be more readily understood from the following detailed description of the various aspects of the invention taken in conjunction with the accompanying drawings in which.

Figure 1:
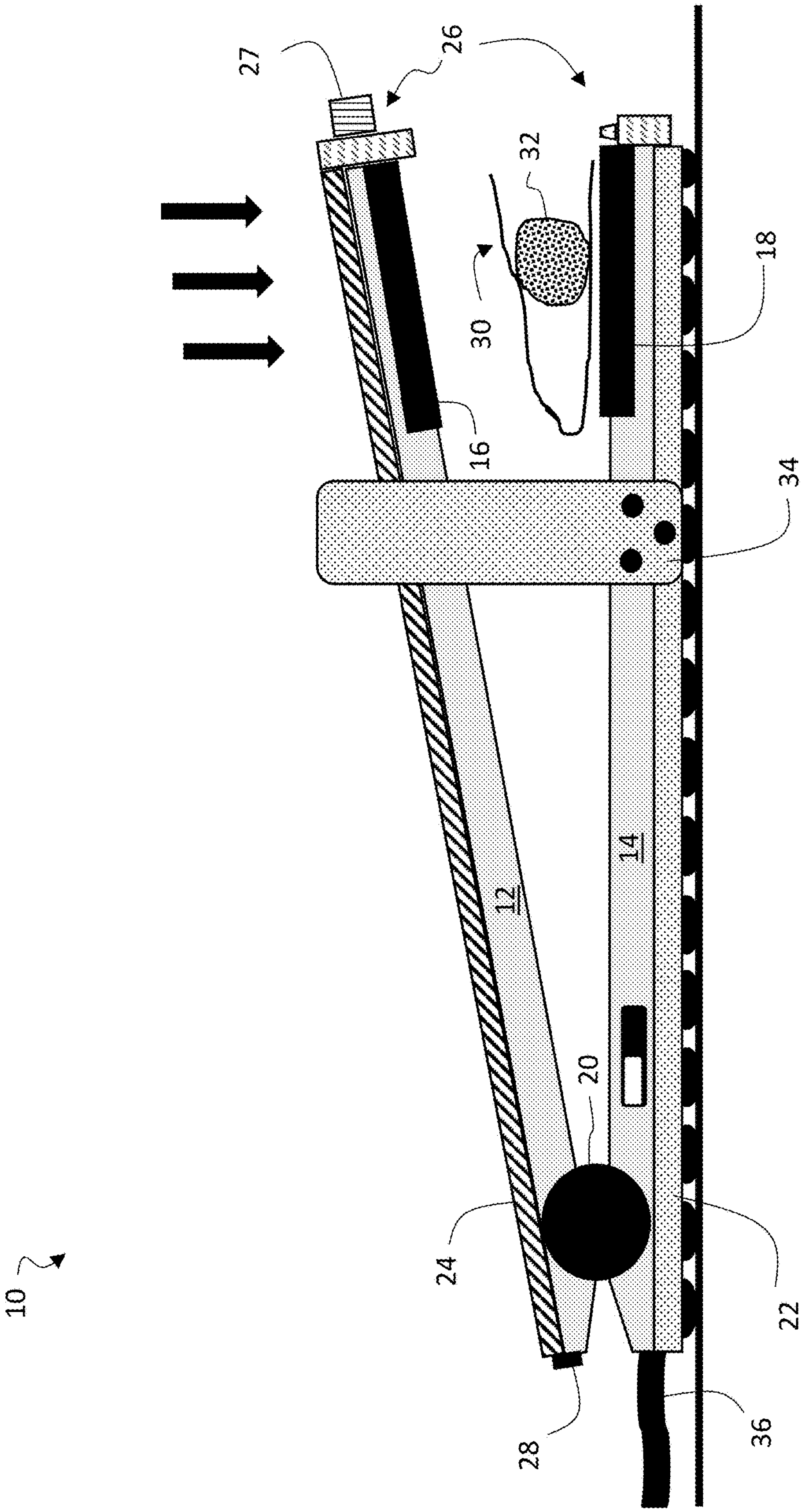
FIG. 1 shows a side view of a cannabis foot press in an open position according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

FIG. 1 depicts a side view of an illustrative foot press 10 in an open position for extracting rosin from a cannabis bud 32 using a pressing operation. Foot press 10 generally include a top section 12, a bottom section 14 and a spring-loaded hinge 20 that couples that top and bottom sections and maintains the press in an open position as shown. Top and bottom section 12, 14 each include a respective heat plate 16, 18 adapted to receive, heat and compress the bud 32 to extract rosin during the pressing operation.

The top section 12 may include a footplate 24 configured to receive a downward pressing motion from a user's foot or footwear. Bottom section 14 may include a baseplate 22 that might for example include non-slip nibs or the like to prevent the foot press 10 from moving around on the floor. It is understood that the footplate 24 and baseplate 22 should be designed and manufactured to allow for maximum pressure to be exerted, e.g., they should not be too pliable so as to interfere with the pressing operation.

In this embodiment, heat plates 16, 18 are heated using an ac power supply 36 that runs through heating coils attached to the plates. In an alternative embodiment, the plates 16, 18 could be heated using battery power. In one illustrative embodiment, heat plates 16, 18 are configured to heat to between 160 and 220 degrees Fahrenheit.

In certain aspects, a lateral stabilizer guide 34 is provided on the bottom section extending upward to ensure that the top section 12 does not move laterally during the pressing operation. It is understood that other arrangements could be utilized to provide lateral stabilization, e.g., the guide 34 could be located adjacent the heat plates 16, 18, or be implemented as a lip along an entire of the top or bottom plate 16, 18, or any other arrangement to ensure lateral stabilization.

Foot press 10 may optionally include a latch 26, which may be utilized to apply additional pressure between the plates when closed after the foot press operation, e.g., by turning a knob 27 on the top section 12 by hand. It is understood that the particular type and configuration of latch 26 can vary and the depicted example is not intended to be limiting.

Foot press 10 may further include an indicator light 28 to indicate that the pressing operation is completed, e.g., based on a timer, heat sensor, pressure sensor, or combination thereof. In other embodiments, an audible signal or tactile output may be utilized to indicate the operation is complete.

In this case, the bud 32 is pre-formed into a ball shape, e.g., by the user rolling and squeezing a bud between their fingers. In some embodiments, a tool may be supplied to form the ball (e.g., something similar to a melon baller and/or garlic press). The formed bud may for example weigh between one and three grams in a typical operation. As shown, the formed bud 32 is placed between a folded piece of parchment paper 30 prior to the pressing operation. Parchment paper 30 acts as a layer of insulation between the heat plates and the formed bud to keep the bud 32 from burning or sticking, and to ensure an even heat application. Any type of heat-resistant, nonstick, food-safe alternative to parchment paper 30 could likewise be used.

Figure 2:
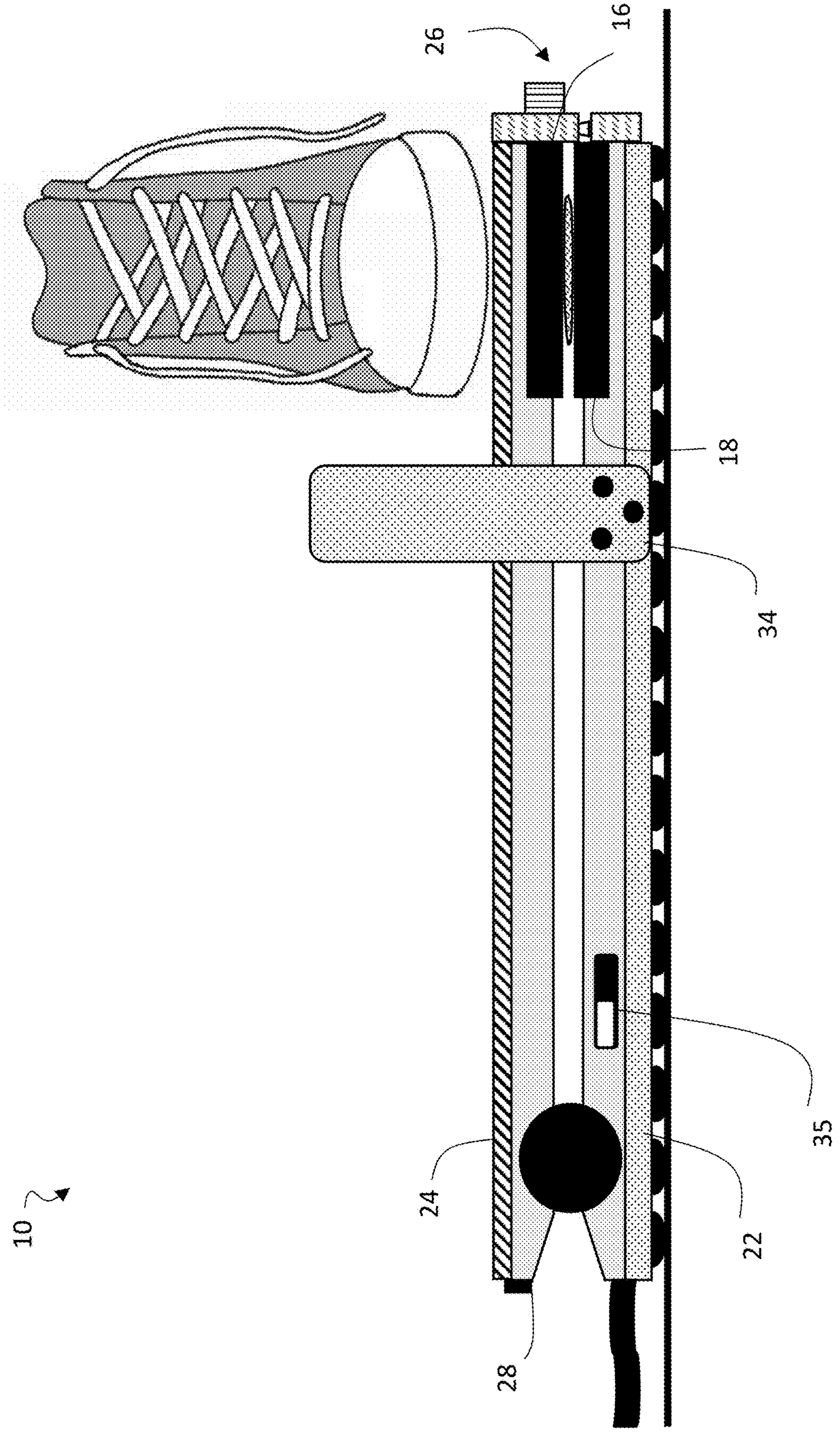
FIG. 2 shows a side view of the cannabis foot press in a closed position according to embodiments.

FIG. 2 depicts the foot press in a closed position, i.e., with the user's foot pressed down thereon. As shown, the bud is pressed and heated for a period of time, e.g., 5-8 seconds. The amount of time required during the pressing operation can vary and may depend on the amount of pressure and heat applied. In some embodiment, foot press 10 may include an adjustment feature 35 (e.g., knob or switch) for altering the amount of heat, e.g., to change the flavor profile.

As shown in FIG. 2, the two plates 16, 18 meet and compress the bud while remaining laterally in place thanks to lateral stabilizer guide 34. It can also be seen that latch 26 is closed, and can be further tightened by hand to further increase the applied pressure after the foot press operation.

Figure 3A:
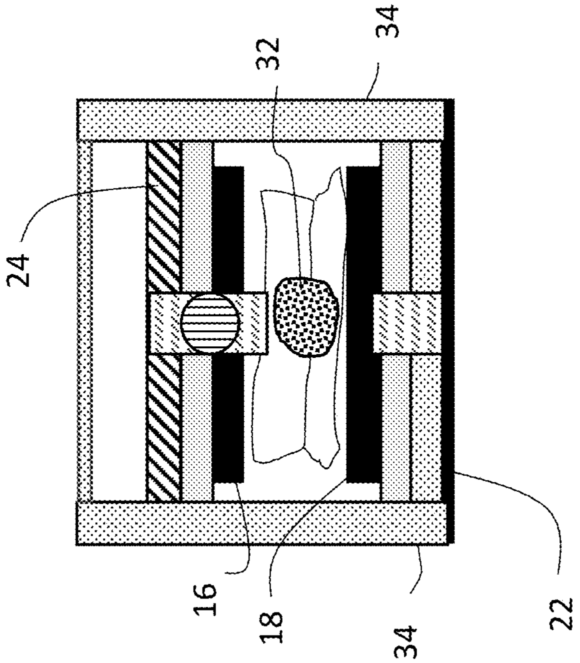
FIG. 3*a* shows a front view of the cannabis foot press in an open position according to embodiments.
Figure 3B:
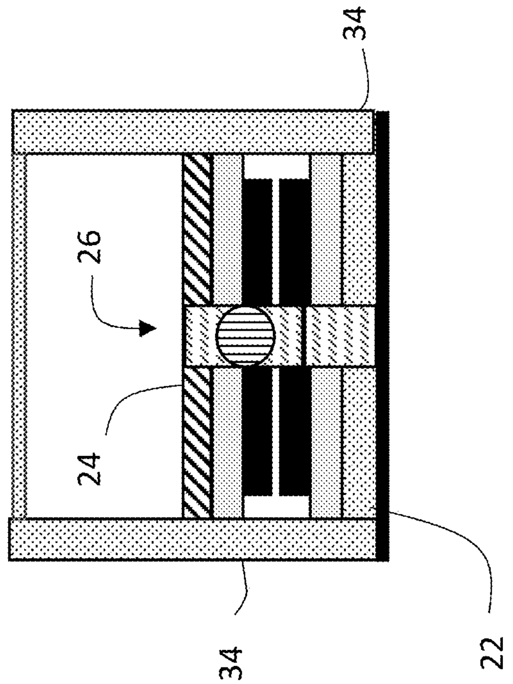
FIG. 3*b* shows a front view of the cannabis foot press in a closed position according to embodiments.

FIG. 3*a* depicts a front-on view of the foot press 10 in the open position and FIG. 3*b* depicts a front-on view of the foot press 10 in the closed position.

Figure 4:
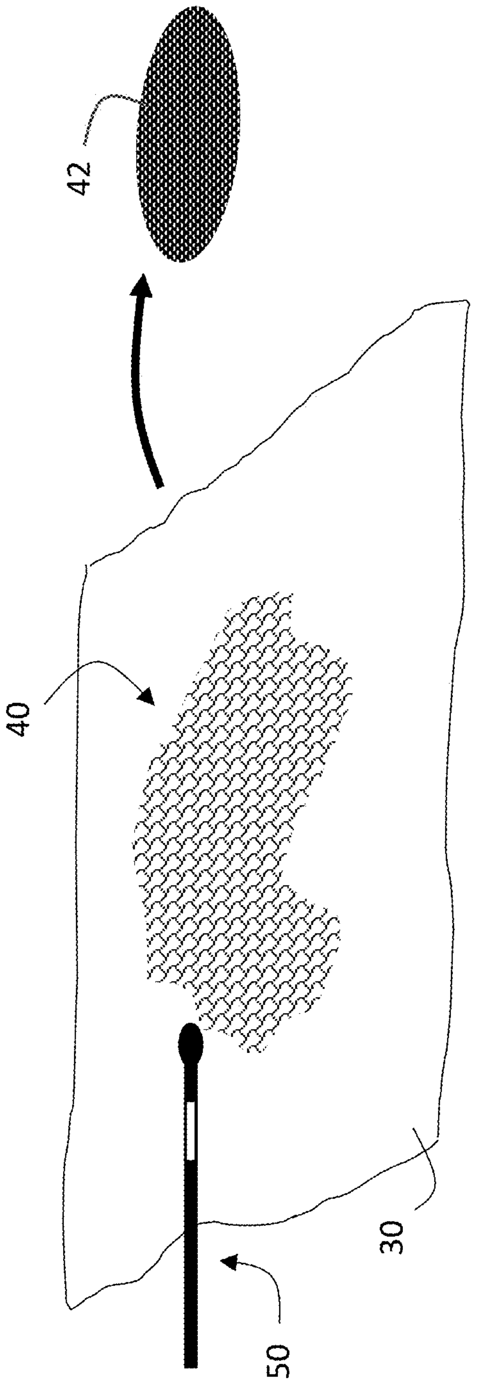
FIG. 4 shows a collection of rosin on parchment paper according to embodiments.
Figure 5:
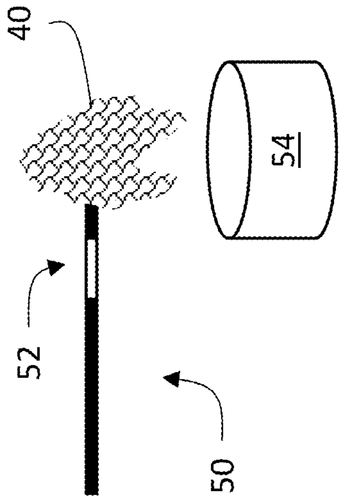
FIG. 5 shows a pick being used to collect and store the rosin according to embodiments.

FIG. 4 depicts the result from the pressing operation, in which the rosin 40 is extracted and stuck to the parchment paper 30. The flattened cannabis bud 42 is removed and discarded. A metal pick 50 can be utilized to remove the rosin 40 from the parchment paper 30. In order to facilitate the removal, the parchment paper 30 containing the rosin 40 may first be chilled, e.g., in a refrigerator, for a brief period, e.g., for a minute or less. The pick 50 can then be deployed to scrape and collect the rosin from the paper and onto the pick 50 as shown in FIG. 5. Once collected, a heat source such as a lighter may be applied to pick region 52 to cause the rosin 40 to be released from the pick and into a container 54 (e.g., a vaporizer chamber).

Figure 6:
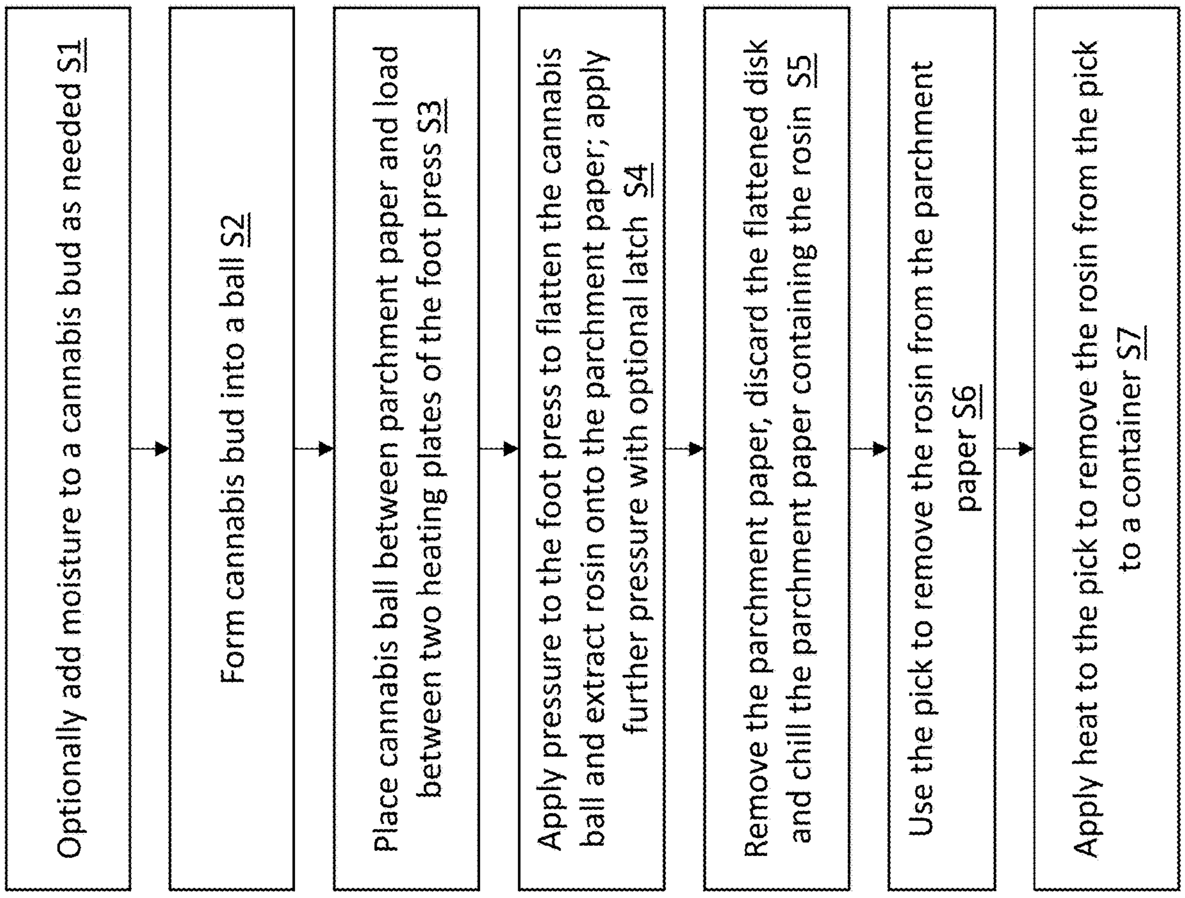
FIG. 6 shows a flow diagram of a method of extracting rosin from a cannabis bud according to embodiments.

FIG. 6 depicts a flow diagram of an illustrative method of implementing a pressing operation with foot press 10. At S1, a small amount of moisture, e.g., water, may optionally be added to a cannabis bud as needed (e.g., depending on how dry or moist the bud is to begin with). At S2, the cannabis bud is formed into a ball and at S3 the ball is placed between parchment paper, and then loaded between the heat plates of the foot press. At S4, pressure is applied to the foot press via the user's foot to compress and flatten the cannabis ball and extract rosin onto the parchment paper, e.g., for about 5-8 seconds at 160-220 degrees F. An optional latch may be utilized (e.g., tightened by hand) to apply further pressure.

At S5, the parchment paper containing the extracted rosin is removed and the resulting flattened bud disk is discarded. The parchment paper containing the rosin may be briefly chilled and at S6 a pick is deployed to remove and collect the chilled rosin from the parchment paper. Finally, at S7, heat is applied to the pick to loosen the rosin and allow it to drip into a container.

In an additional aspect, a complete system may be packaged as part of a kit that includes a foot press 10, a pick 50 and a supply of pre-cut or perforated parchment papers (e.g., in a dispenser).

It is understood that the particular form factor of the foot press 10 may vary from what is shown. For example, the press may include curved surfaces for gripping with a user's hand. The size of the press and heat plates can vary and the location of the heat plates within the press can vary. In one illustrative embodiment, the approximate length of the foot press is about seven to ten inches long and the size of the heat plates are approximately a 2"×2" square. In other cases, the heat plates may be rectangular, round or oval shape. In one embodiment the heat plates have flat surfaces, but any type of surface that can deliver consistent pressure and heat to maximize rosin extraction could be utilized.

Figure 7:
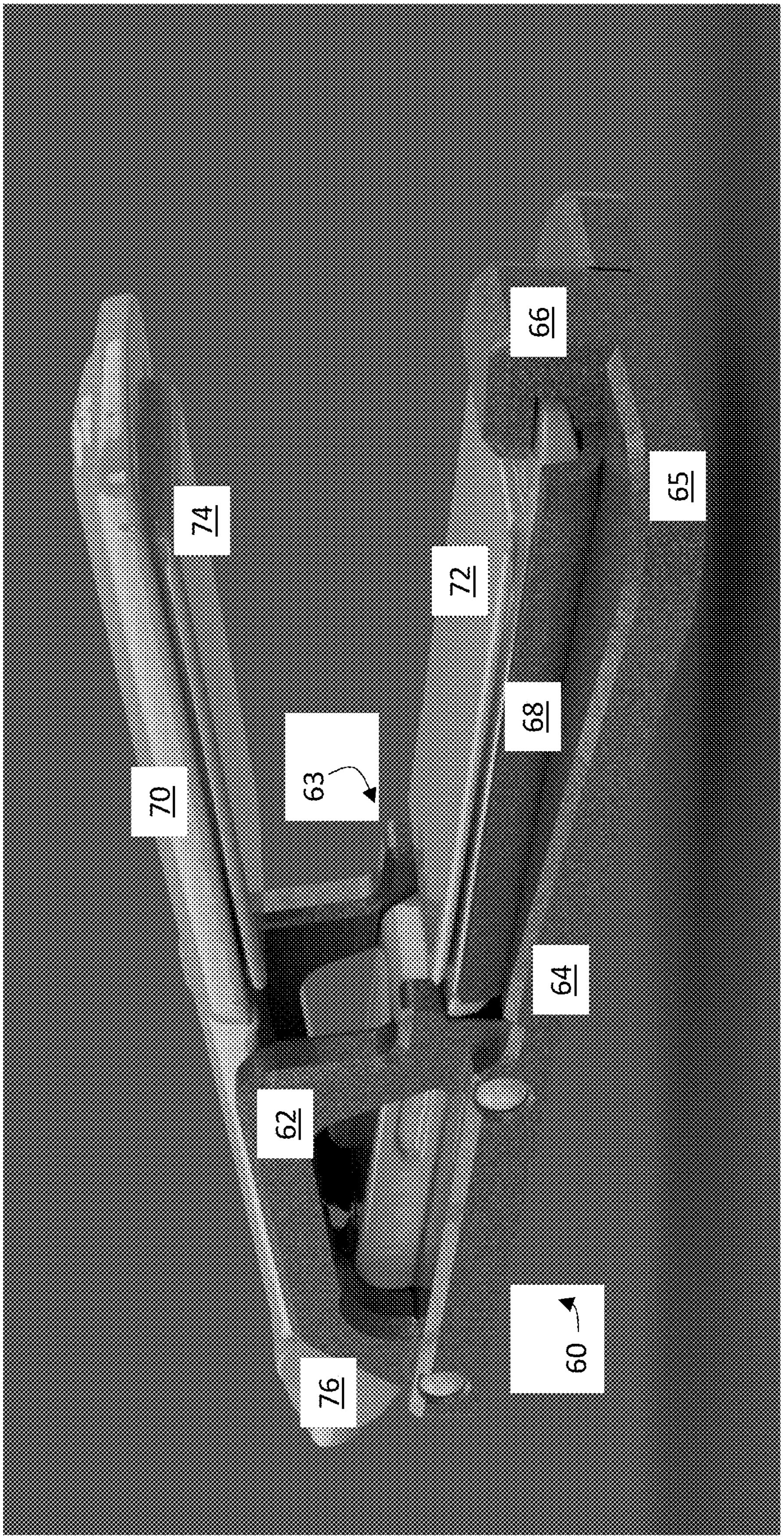
FIG. 7 depicts an embodiment involving a baseplate and removably attachable heat press unit according to embodiments.

FIG. 7 depicts an alternative detachable configuration that includes a baseplate 60 and a heat press unit 70. In this embodiment, heat press unit 70 is adapted to be removably attached (e.g., snapped, clamped, strapped, etc.) to the baseplate 60. In certain aspects, the heat press unit 70 may comprise an off-the-shelf device, such as a hair straighter/straightening iron that includes a lower heat plate 72, an upper heat plate 74 and a hinged back end 76. The baseplate 60 may be configured to receive different size/shape heat press units 70. In this embodiment, baseplate 60 is configured to releasably attach to the heat press unit 70. The heat press unit 70 generally includes a top section having the first heat plate 74 and a bottom section having the second heat plate 72, wherein the top section is configured to close downwardly towards the bottom section by pressing downwardly (e.g., with a user's foot) such that the first heat plate 74 is pressable towards the second heat plate 72.

In the illustrative embodiment shown, baseplate 60 includes a substrate 64, a pair of lateral stabilizer guides 62 for providing lateral stability, a notch 66 for receiving a lower end of the heat press unit 70 adjacent the lower heat plate 72, guide rails 68 on which the lower portion of the heat press unit 70 sit upon, and a widened substrate portion 65 to provide additional stability. In this example, the widened portion 65 is triangular in shape, however other shapes (e.g., rectangular, round, etc.) could be used. Incorporated in lateral guides 62 are a pair of stoppers 63 configured to conform to the notched back end of the lower portion near lower heat plate 72 to further secure the heat press unit 70 in place (along with notch 66).

Figure 8B:
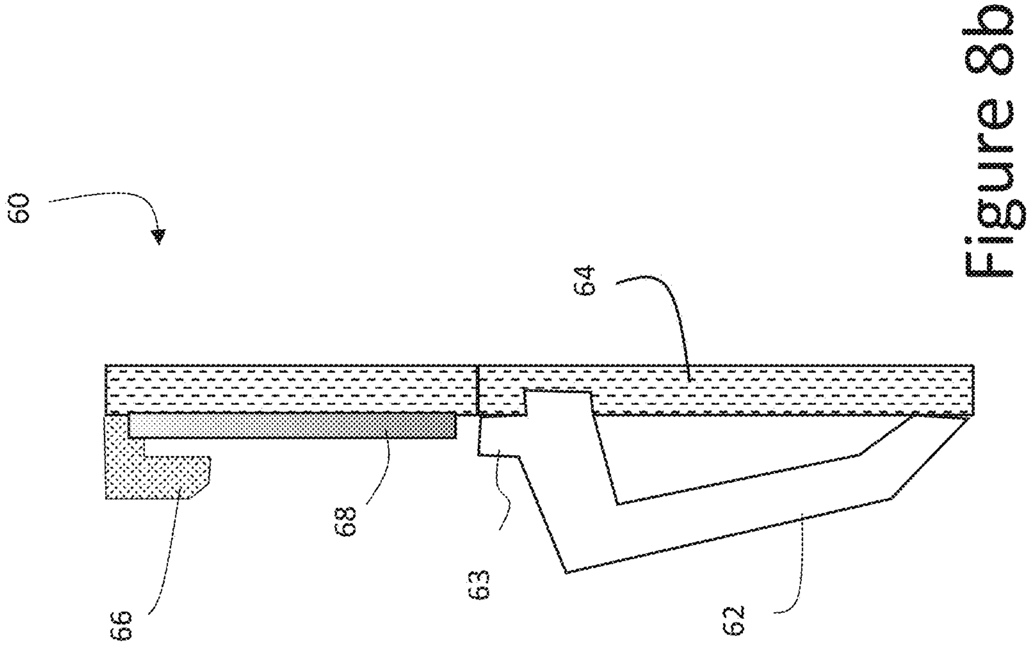
FIG. 8*b* depicts a side view of the baseplate of FIG. 7 according to embodiments.
Figure 8A:
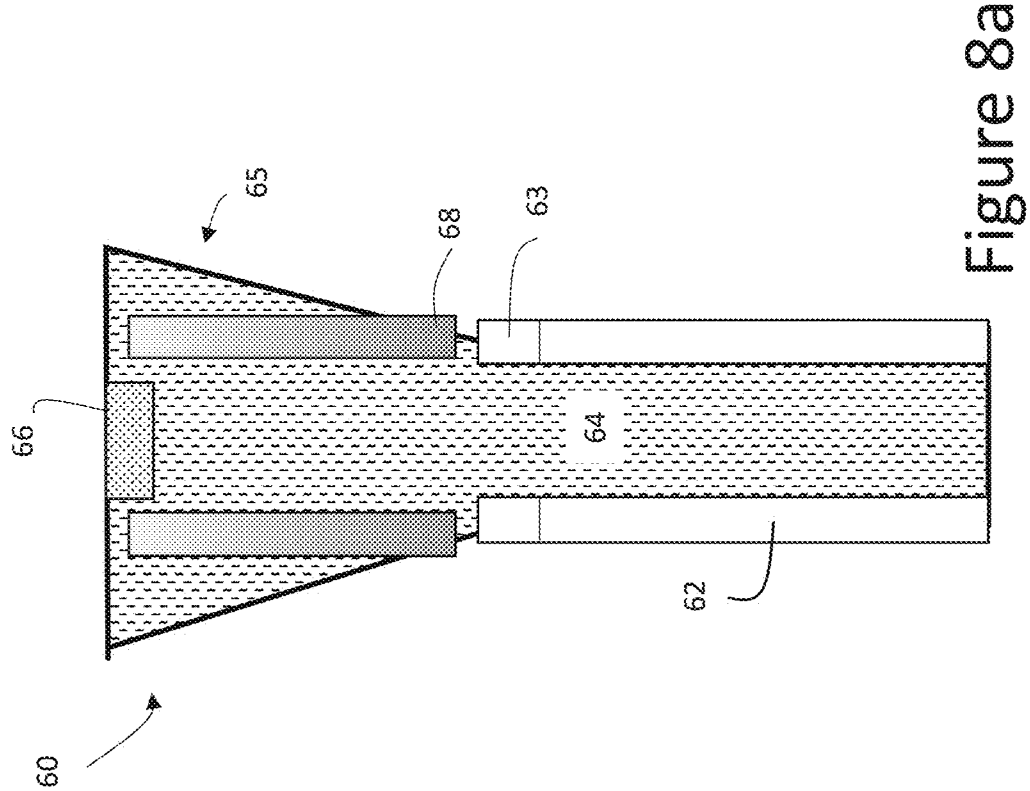
FIG. 8*a* depicts a top view of the baseplate of FIG. 7 according to embodiments.

FIGS. 8*a*, and 8*b* depict a top and side view, respectively, of base plate 60, shown without the heat press unit 70. Similar to what is shown in FIG. 7, base plate 60 includes a pair of lateral guides 62 for providing lateral stability, a notch 66 for receiving an end of lower section of the heat press unit 70 adjacent the lower heat plate 72, guide rails 68 on which the lower portion of the heat press unit sit upon, and a widened substrate portion 65 to provide additional stability. Incorporated in lateral guides 62 are a pair of stoppers 63 configured to conform to the notched back end of lower heat plate 72 to, along with notch 66, further secure the heat press unit 70 in place.

Note that any of the features of any of the embodiments may be shared with the other embodiments.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A foot press system for extracting rosin from a cannabis bud, comprising:

a heat press unit having a pivotable top section with a first heat plate and a foot plate, and a bottom section having a second heat plate;

a baseplate configured to releasably attach to the heat press unit, wherein the top section is configured to close downwardly towards the bottom section such that the first heat plate is pressable towards the second heat plate, and wherein the baseplate includes:

a substrate having a first side adapted to lay on a flat surface and a second side adapted to receive the bottom section of the heat press unit;

a pair of lateral stabilizer guides coupled to the substrate and configured to maintain the top section in a laterally stable position as the top section is moved downwardly relative to the pair of lateral stabilizer guides toward the bottom section by a user's foot stepped on the foot plate; and a notch configured to receive only an end of the bottom section of the heat press unit proximate the second heat plate, wherein the notch is spaced away from the pair of lateral stabilizer guides.

2. The foot press system of claim 1, wherein the baseplate further includes a pair of guide rails on the second side of the substrate for receiving the bottom section of the heat press unit.

3. The foot press system of claim 1, wherein the baseplate further includes a pair of stoppers configured to conform to a notched region of the bottom section of the heat press unit.

4. The foot press system of claim 1, wherein the substrate includes a widened portion to provide additional stability.

5. The foot press system of claim 4, wherein the widened portion is triangular shaped.

6. The foot press system of claim 1, wherein the heat press unit comprises a straightening iron, and wherein the foot plate comprises an exterior surface of the top section.

7. A foot press system for extracting rosin from a cannabis bud, comprising:

a heat press unit having a pivotable top section with a first heat plate and a foot plate, and a bottom section having a second heat plate, wherein the top section is configured to close downwardly towards the bottom section such that the first heat plate is pressable towards the second heat plate;

a baseplate configured to releasably attach to the heat press unit, wherein the baseplate includes:

a substrate having a first side adapted to lay on a flat surface and a second side adapted to receive the bottom section of the heat press unit;

a pair of lateral stabilizer guides coupled to the substrate and configured to maintain the top section in a laterally stable position as the top section is moved downwardly relative to the pair of lateral stabilizer guides toward the bottom section by a user's foot stepped on the foot plate; and a notch configured to receive only a part of the bottom section of the heat press unit, wherein the notch is spaced away from the pair of lateral stabilizer guides.

8. The foot press system of claim 7, wherein the baseplate further includes a pair of guide rails on the second side of the substrate for receiving the bottom section of the heat press unit.

9. The foot press system of claim 7, wherein the baseplate further includes a pair of stoppers configured to conform to a notched region of the bottom section of the heat press unit.

10. The foot press system of claim 7, wherein the substrate includes a widened portion to provide additional stability.

11. The foot press system of claim 10, wherein the widened portion is triangular shaped.

12. The foot press system of claim 7, wherein the heat press unit comprises a straightening iron.

13. The foot press system of claim 7, wherein the substrate includes a non-slip surface.

14. The foot press system of claim 7, wherein the notch is proximate to the second heat plate.

* * * * *